United States Patent
Hashimoto et al.

(10) Patent No.: US 11,542,066 B2
(45) Date of Patent: Jan. 3, 2023

(54) TUBE CONTAINER

(71) Applicant: YOSHINO KOGYOSHO CO., LTD., Tokyo (JP)

(72) Inventors: Kazuhiro Hashimoto, Tokyo (JP); Takashi Miya, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 17/271,120

(22) PCT Filed: Jun. 19, 2019

(86) PCT No.: PCT/JP2019/024237
§ 371 (c)(1),
(2) Date: Feb. 24, 2021

(87) PCT Pub. No.: WO2020/044741
PCT Pub. Date: Mar. 5, 2020

(65) Prior Publication Data
US 2021/0245930 A1 Aug. 12, 2021

(30) Foreign Application Priority Data

Aug. 30, 2018 (JP) .............................. JP2018-161743

(51) Int. Cl.
*B65D 35/10* (2006.01)
*B32B 27/32* (2006.01)
*B32B 27/36* (2006.01)

(52) U.S. Cl.
CPC .............. *B65D 35/10* (2013.01); *B32B 27/32* (2013.01); *B32B 27/36* (2013.01)

(58) Field of Classification Search
CPC .................................. B32B 27/32; B32B 27/36
See application file for complete search history.

(56) References Cited

U.S. PATENT DOCUMENTS 4,595,612 A * 6/1986 Tavss ..................... B65D 35/02
428/458
4,733,800 A * 3/1988 Bjorkengren ........... B29C 53/50
156/203

FOREIGN PATENT DOCUMENTS

CN  206750531 U  12/2017
EP  177 470 A2  4/1986
(Continued)

OTHER PUBLICATIONS

Dec. 7, 2021 Office Action issued in Japanese Patent Application No. 2018-161743.
(Continued)

*Primary Examiner* — Michael C Miggins
(74) *Attorney, Agent, or Firm* — Oliff PLC (57) ABSTRACT

Proposed is a tube container in which generation of scratches on a surface of the container can be prevented. The present tube container (100) includes a tube body (30) that defines a container space (S) for contents and that has a laminated structure. The tube body (30) includes: a cylindrical laminated sheet (31) in which both edges (31*a*, 31*b*) of the sheet are butted together; and a reinforcing tape portion (reinforcing tape 35) provided on an inner surface of the laminated sheet (31) along a butted portion (32). The laminate sheet (31) includes a high hardness protective layer (18) constituting an outermost layer, an outer polyethylene-based resin layer (21) formed on an inner side of the high hardness protective layer (18), and an inner polyethylene-based resin layer (11) constituting an innermost layer, and the high hardness protective layer (18) has a pencil hardness of 3B or greater than 3B. The reinforcing tape portion (35) includes a polyethylene-based resin layer (outer reinforcing resin layer 59) as an outermost layer abutting against the inner surface of the laminate sheet (31).

6 Claims, 6 Drawing Sheets

(56) References Cited

FOREIGN PATENT DOCUMENTS

| | | |
|---|---|---|
| EP | 2 674 368 A1 | 12/2013 |
| JP | S60-220748 A | 11/1985 |
| JP | H05-15174 B2 | 2/1993 |
| JP | H06-166107 A | 6/1994 |
| JP | H07-041020 A | 2/1995 |
| JP | H08-104340 A | 4/1996 |
| JP | H10-129642 A | 5/1998 |
| JP | H11-254595 A | 9/1999 |
| JP | 2007-030424 A | 2/2007 |
| JP | 2010-235160 A | 10/2010 |
| JP | 2010-280403 A | 12/2010 |
| JP | 2011-232388 A | 11/2011 |
| JP | 2017-114507 A | 6/2017 |
| JP | 2017-114508 A | 6/2017 |

OTHER PUBLICATIONS

Mar. 2, 2021 International Preliminary Report on Patentability issued in International Patent Application No. PCT/JP2019/024237.
Sep. 10, 2019 International Search Report issued in International Patent Application No. PCT/JP2019/024237.
Mar. 8, 2022 Office Action issued in Japanese Application No. 2018-161743.
May 18, 2022 Extended European Search Report issued in European Application No. 19855198.8.
Aug. 23, 2022 Office Action issued in Japanese Application No. 2018-161743.

* cited by examiner

TUBE CONTAINER

CROSS-REFERENCE TO RELATED APPLICATION

This application claims the priority to Japanese Patent Application No. 2018-161743, filed on Aug. 30, 2018, the entire contents of which are incorporated herein by reference.

TECHNICAL FIELD

The present disclosure relates to a tube container that can dispense contents when being pressed on a trunk.

BACKGROUND

Tube containers in which cosmetic products, toothpaste, pharmaceutical agents, seasoning, or the like can be filled as contents and which can dispense the contents when being pressed on trunks of the containers are desired to have good light-shielding properties and good gas barrier properties so as to prevent deterioration of the contents, while still enjoying enhanced aesthetic appearances of the containers.

For example, Patent Literature 1 (PTL1) describes a tube container that includes a metal vapor-deposited layer and a barrier layer and that is designed to have glossy properties, in addition to light-shielding properties and gas barrier properties.

CITATION LIST

Patent Literature

PTL 1: JP 2017-114508 A

SUMMARY

Technical Problem

In the tube container described in PTL 1, however, scratches are sometimes generated on a surface of the container during or after manufacturing of the container, although the glossy properties can be improved, and there is still room for improvement in terms of enhanced aesthetic appearance of the container.

It would be helpful to provide a tube container in which generation of scratches on the surface of the container can be prevented.

Solution to Problem

A tube container according to an embodiment of the present disclosure includes a tube body that defines a container space for contents and that has a laminated structure of a plurality of materials, wherein
the tube body includes:
a cylindrical laminated sheet in which both edges of the sheet are butted together; and
a reinforcing tape portion provided on an inner surface of the laminated sheet along a butted portion, and
the laminate sheet includes a high hardness protective layer constituting an outermost layer, an outer polyethylene-based resin layer formed on an inner side of the high hardness protective layer, and an inner polyethylene-based resin layer constituting an innermost layer, the high hardness protective layer having a pencil hardness of 3B or greater than 3B, and wherein
the reinforcing tape portion includes a polyethylene-based resin layer as an outermost layer abutting against the inner surface of the laminate sheet.

In a preferred embodiment of the present tube container configured as above, the high hardness protective layer contains polyethylene terephthalate.

In another preferred embodiment of the present tube container configured as above, the outer polyethylene-based resin layer has a thickness greater than a thickness of the high hardness protective layer.

In still another preferred embodiment of the present tube container configured as above, the outer polyethylene-based resin layer has a thickness of 30 μm or more, and the high hardness protective layer has a thickness of 16 μm or less.

In still another preferred embodiment of the present tube container configured as above, the outermost layer and an innermost layer of the reinforcing tape portion each have a thickness greater than a thickness of any other intermediate layer of the reinforcing tape portion.

In still another preferred embodiment of the present tube container configured as above, the outermost layer of the reinforcing tape portion has a color different from a color of other constituent layers of the reinforcing tape portion.

In still another preferred embodiment of the present tube container configured as above, the laminated sheet and the reinforcing tape portion each includes a barrier layer having a metal foil.

Advantageous Effect

The present disclosure provides a tube container in which generation of scratches on the surface of the container can be prevented.

BRIEF DESCRIPTION OF THE DRAWINGS

In the accompanying drawings.

DETAILED DESCRIPTION

The present disclosure will be described in more detail below with reference to the drawings.

Figure 1:
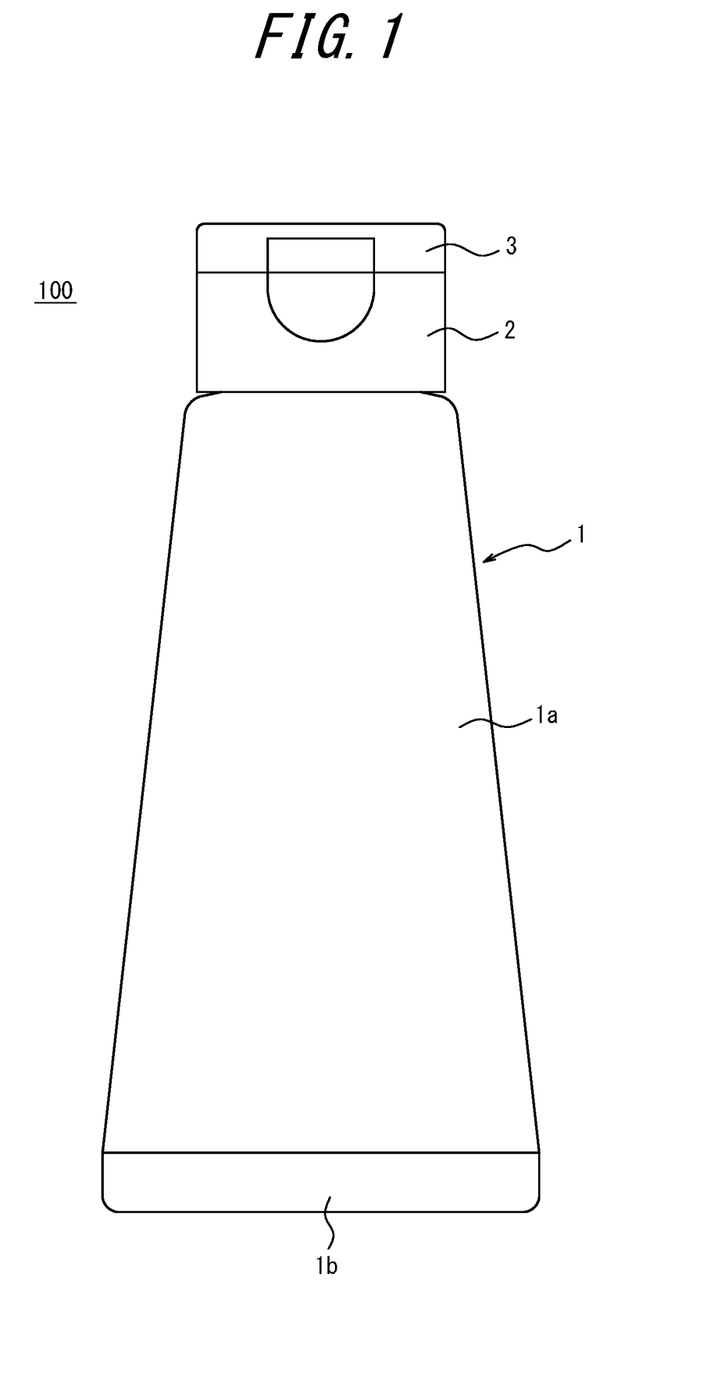
FIG. 1 is a front view illustrating a tube container according to an embodiment of the present disclosure.

FIG. 1 is a front view illustrating a configuration of a tube container 100 that is an embodiment of the present disclosure. The tube container 100 includes a container main body 1 that defines a container space S (refer to FIG. 2) for contents, a dispensing cap 2 that is fitted to a mouth 42 (refer to FIG. 2) of the container main body 1, and a lid 3 that closes a dispensing orifice of the dispensing cap 2. It should be noted that in the present specification, claims, abstract, and drawings, a side on which the lid 3 is located is defined as an upward direction (an upper side in FIG. 1), and a side on which the container main body 1 is located is defined as a downward direction (a lower side in FIG. 1). Further, in descriptions regarding layer compositions for the container main body 1, a side on which the container space S is located is defined as an inner side, and a side on which an outer circumferential surface of the container main body 1 is located is defined as an outer side.

Figure 2:
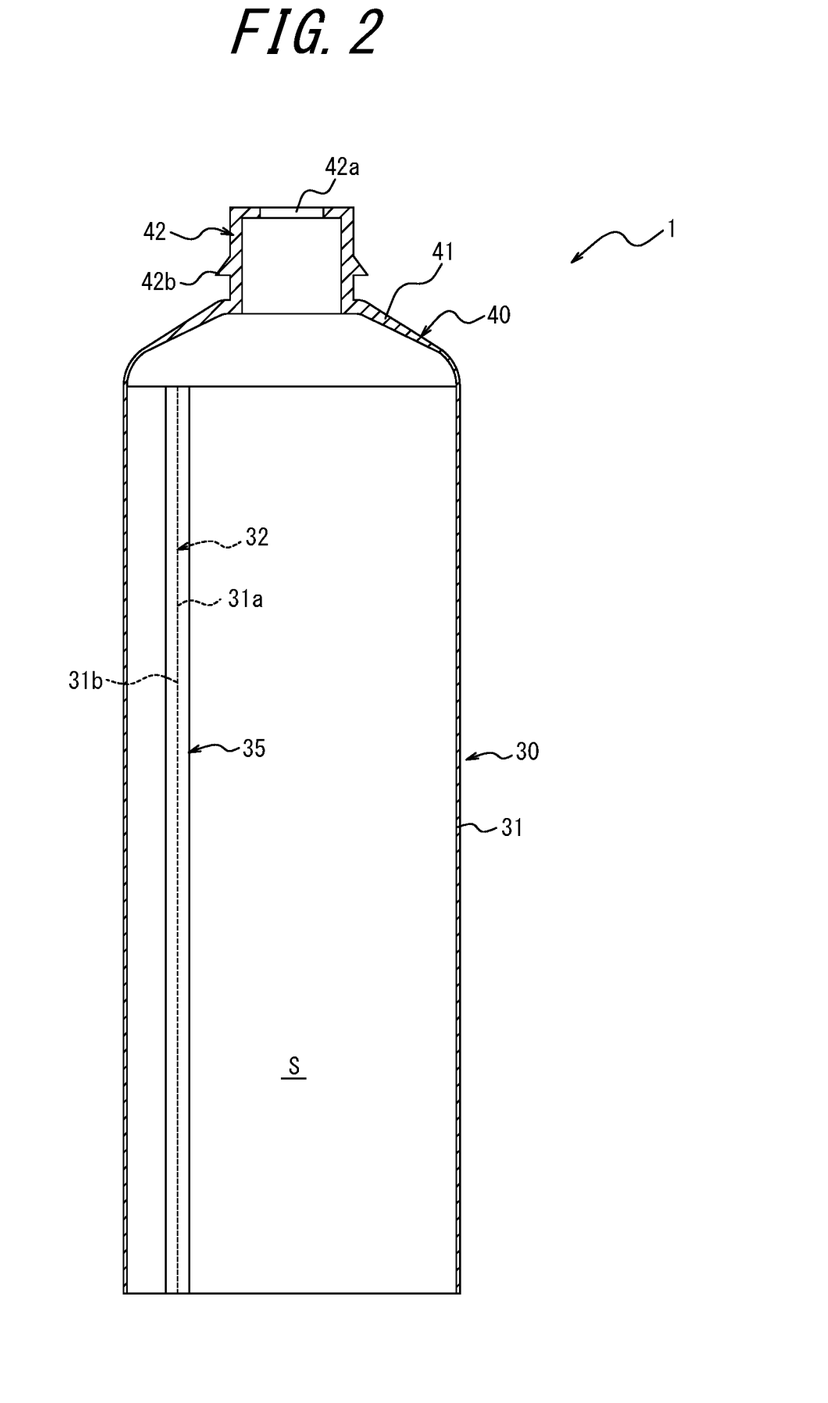
FIG. 2 is a sectional front view illustrating a container body (having no seal on a bottom) that constitutes the tube container according to the embodiment of the present disclosure.

First, the container main body 1 will be described. As illustrated in FIG. 1, the container main body 1 defines the container space S (refer to FIG. 2) for the contents, and includes a trunk 1a that, when being pressed, causes the contents to be dispensed, and a bottom 1b that closes a lower end of the trunk 1a. As a method for manufacturing the container main body 1, for example, a tube body 30, in which the container space S for the contents is defined, and a head 40 may be assembled for formation of the container main body 1, as illustrated in FIG. 2. The head 40 is provided with the mouth 42 which opens upward and to which the dispensing cap 2 can be mounted.

The tube body 30 can be formed in a substantially cylindrical shape by, for example, rolling a laminated sheet 31, which has been molded into a band shape and which has a laminated structure, in a manner such that both edges 31a, 31b thereof are butted together in a butted portion 32 and by performing welding at the butted portion 32 by means, such as high-frequency seals or heat seals. Although in the present embodiment the tube body 30 has a substantially cylindrical shape, the tube body 30 may have any shape that is substantially tubular, such as a substantially elliptic cylindrical shape.

Figure 3:
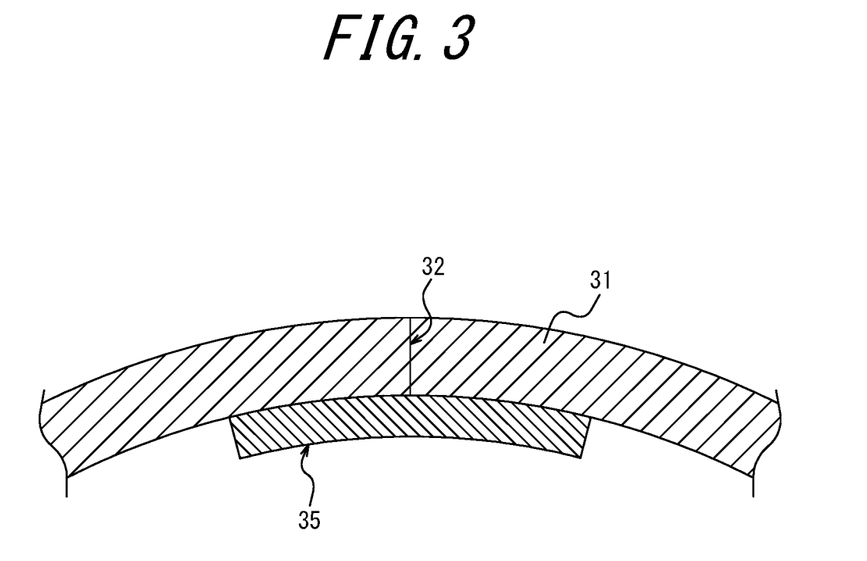
FIG. 3 is an enlarged sectional plan view illustrating a butted portion and a reinforcing tape portion of the container body constituting the tube container according to the embodiment of the present disclosure.

Further, as illustrated in FIG. 2 and FIG. 3, to reinforce joining at the butted portion 32 of the laminated sheet 31, the tube body 30 has an inner surface that is provided, along the butted portion 32, with a reinforcing tape 35.

In the present embodiment, the head 40 includes a shoulder 41 formed in a truncated cone shape. The head 40 can be provided integrally and contiguously with the tube body 30, for example, with an outer circumferential edge of the shoulder 41 being welded to an inner circumferential surface at an upper end of the tube body 30 over an entire circumference thereof. The head 40 may also be integrally formed with the tube body 30 by placing the aforementioned tube body 30, along with a material for the head 40, in a mold and performing compression molding.

The shoulder 41 has a central portion that is provided with the cylindrical mouth 42 protruding upward. The mouth 42, at a tip thereof, has an opening 42a that communicates with the container space S for the contents. The mouth 42 has an outer circumferential surface that is provided with an annular projection 42b for fitting the dispensing cap 2 to the mouth 42.

After filling the contents into the container space S through an open end at a lower portion of the tube body 30 having such a substantially cylindrical shape, the open end is closed by means, such as high-frequency seals or heat seals, so as to form the bottom 1b. Thus, the container main body 1 is formed.

Figure 4:
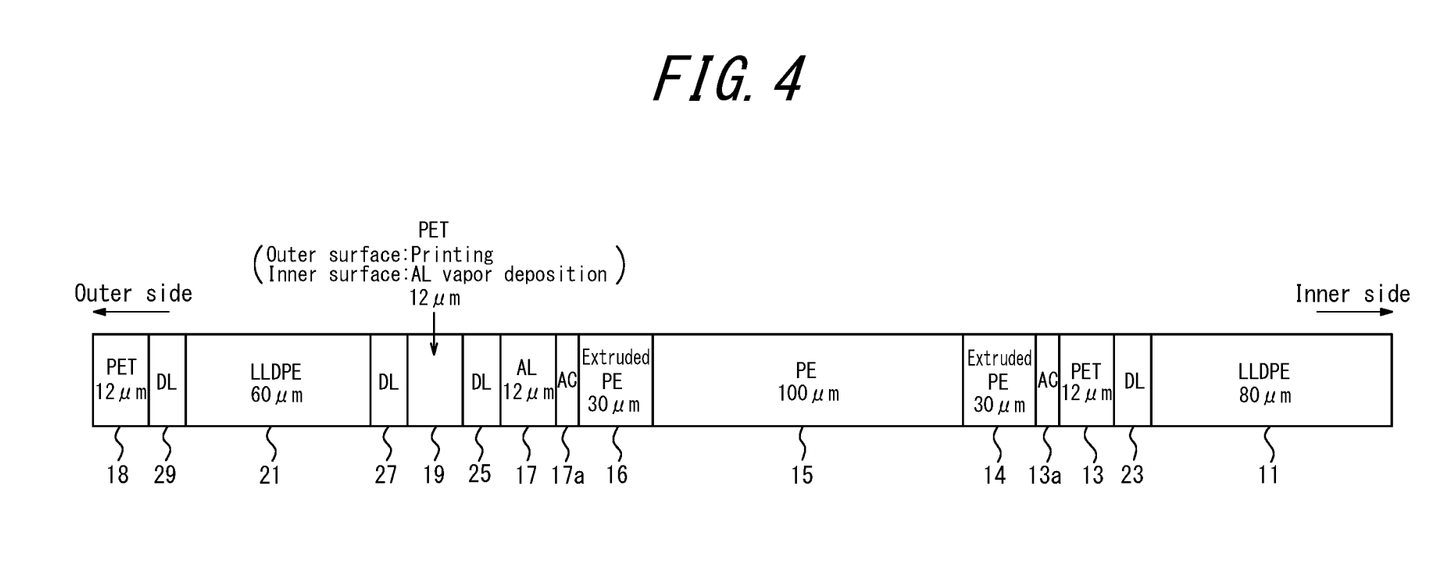
FIG. 4 illustrates a layer composition of a laminate sheet in the tube container according to the embodiment of the present disclosure.

In the present embodiment, the laminated sheet 31 for the tube body 30 that constitutes the trunk 1a of the container main body 1 has a layer composition as illustrated in FIG. 4. That is, the laminate sheet 31 for the container main body 1 includes, in order from the inner side which is the side closer to the container space S, an inner polyethylene-based resin layer 11, a dry laminate (DL) adhesive layer 23, a polyethylene terephthalate (PET) film layer 13, an extruded polyethylene (PE) layer 14, a polyolefin resin layer 15 made of a polyethylene (PE) film, an extruded polyethylene (PE) layer 16, an aluminum (AL) foil 17 as a barrier layer, a dry laminate (DL) adhesive layer 25, a high reflection layer 19 in which gravure printing is performed on an outer side of a PET film and aluminum is vapor-deposited on an inner side of the PET film, a dry laminate adhesive layer 27, an outer polyethylene-based resin layer 21, a dry laminate adhesive layer 29, and a high hardness protective layer 18. Additionally, other portions of the container main body 1 than the trunk 1a may have the same layer composition as the trunk 1a, or may have a composition in which some layers are omitted or some layers are added.

The aluminum foil 17 functions as the barrier layer having light-shielding properties, oxygen barrier properties, and water vapor barrier properties. From the perspective of guaranteeing flexibility, restorability, or the like of the trunk 1a while guaranteeing required light-shielding properties, oxygen barrier properties, and water vapor barrier properties, the aluminum foil 17 preferably has a thickness in the range of 7 μm to 20 μm. In the present embodiment, the aluminum foil 17 has a thickness of approximately 12 μm. Additionally, as the barrier layer, a metal foil other than an aluminum foil (e.g., a gold foil, silver foil, platinum foil, copper foil, titanium foil, tin foil, etc.) may be also used.

The high reflection layer 19 includes a base material made of the polyethylene terephthalate (PET) film, which has one side (i.e., an inner surface) on which an aluminum vapor-deposited film is formed and has another side (i.e., an outer surface) on which gravure printing is performed for decoration. In the present embodiment, the aluminum vapor-deposited film is formed on one side of the base material having a small surface roughness and therefore, has a similarly small surface roughness and cause a low degree of scattering of incident light; the aluminum vapor-deposited film can therefore provide a high light reflectance (glossiness) despite its small thickness. In the present embodiment, the base material has a thickness of approximately 12 μm, and the aluminum vapor-deposited film has a thickness of approximately 100 nm. The thickness of the aluminum vapor-deposited film is preferably 50 nm or greater so as to achieve a high reflectance (glossiness). Additionally, any of other metal vapor-deposited films of gold, silver, platinum, zinc, nickel, or the like may be formed instead of the aluminum vapor-deposited film.

In the present embodiment and by performing gravure printing on the outer surface of the base material and by forming the aluminum vapor-deposited film on the inner surface of the base material, the container main body 1 is allowed to have both decorativeness and glossy and shiny properties. The present applicant has conducted earnest studies and found that, when gravure printing is additionally performed on the aluminum vapor-deposited film, the aluminum vapor-deposited film can be deteriorated due to an organic solvent used in the gravure printing, thus sometimes resulting in a failure to achieve a desired reflectance. It is therefore necessary to form the aluminum vapor-deposited film and the decoration by gravure printing on different sides of the base material. Further, formation of the aluminum vapor-deposited film on the outer side of the base material degrades visibility of the decoration formed by gravure printing on the inner side of the base material. For the above reasons, the high reflection layer 19 is configured such that the decoration is provided by gravure printing on the outer side of the base material and that the aluminum vapor-deposited film is formed on the inner side of the base material. Additionally, any of a variety of resin films other than the polyethylene terephthalate (PET) film may be used as the base material, in which the surface roughness of the metal vapor-deposited film only needs to be reduced. The surface roughness of the metal vapor-deposited film is preferably less than the surface roughness of the metal foil.

In the present embodiment, as illustrated in FIG. 4, the high reflection layer 19 is adhered to an outer surface of the aluminum foil 17 via the dry laminate (DL) adhesive layer 25. The dry laminate adhesive layer 25 is an adhesive layer used to bond, after an adhesive agent is applied to one film before lamination and the adhesive agent is dried, the one film to another film by pressure bonding.

The outer polyethylene-based resin layer 21 in the present embodiment is made of linear low-density polyethylene (LLDPE) having flexibility, transparency, and sealing properties. Any of a variety of polyethylene resins other than LLDPE, such as low-density polyethylene (LDPE) or high-density polyethylene resin (HDPE), can be used as polyethylene used for the outer polyethylene-based resin layer 21. In the present embodiment, the outer polyethylene-based resin layer 21 has a thickness of approximately 60 μm. As described later, by making the thickness of the outer polyethylene-based resin layer 21 greater than the thickness of the high hardness protective layer 18, when the both edges 31a, 31b (refer to FIG. 3) of the laminate sheet 31 are butted together for high-frequency sealing or heat-sealing, both edges of the outer polyethylene-based resin layer 21 can be welded with a predetermined degree of strength. Accordingly, even if both edges of the high hardness protective layer 18 cannot be sealed together with a sufficient degree of strength due to, for example, a high melting point of the high hardness protective layer 18, it is possible to guarantee welding strength at a portion corresponding to the outer polyethylene-based resin layer 21, whereby defects, such as flexure of the butted portion 32 caused when welding between the both edges 31a, 31b peels off at the butted portion 32, may be prevented. Additionally, the outer polyethylene-based resin layer 21 is adhered to an outer surface of the high reflection layer 19 via the dry laminate adhesive layer 27.

The high hardness protective layer 18 in the present embodiment constitutes an outermost layer of the laminate sheet 31, and is formed of a polyethylene terephthalate (PET) film having high hardness so as to prevent scratches or the like from being generated on an outer surface of the container main body 1. In the present embodiment, the thickness of the high hardness protective layer 18 is approximately 12 μm. The PET film used as the high hardness protective layer 18 in the present embodiment has a pencil hardness of "H" obtained by the scratch hardness (pencil method) measurement defined by JIS K 5600-5-4. It should be noted that the applicant have conducted earnest studies and achieved the result that, when the pencil hardness of the high hardness protective layer 18 is "3B" or greater than "3B", scratches beyond the standard are not generated in later-described wear resistance tests. The high hardness protective layer 18 is adhered to an outer surface of the outer polyethylene-based resin layer 21 via the dry laminate adhesive layer 29.

Additionally, to achieve optimal high frequency sealing or heat sealing by butting the both edges 31a, 31b of the aforementioned laminate sheet 31 together, the thickness of the high hardness protective layer 18 is preferably 16 μm or less, and the thickness of the outer polyethylene-based resin layer 21 is preferably 30 μm or more.

The inner polyethylene-based resin layer 11 in the present embodiment constitutes an innermost layer of the laminate sheet 31, and is made of linear low-density polyethylene (LLDPE) having flexibility, transparency, and sealing properties in the same manner as the outer polyethylene-based resin layer 21. In the present embodiment, the inner polyethylene-based resin layer 11 has a thickness of approximately 80 μm. In this way, since a polyethylene-based resin having a low melting point is used for the innermost layer of the laminate sheet 31, the open end at the lower portion of the tube body 30 can be easily closed by means, such as high-frequency seals or heat seals, so as to form a bottom 1b. Additionally, as is the case with the outer polyethylene-based resin layer 21, any of a variety of polyethylene-based resins other than LLDPE, such as low-density polyethylene (LDPE) or high-density polyethylene resin (HDPE), can be used for the inner polyethylene-based resin layer 11.

The PET film layer 13 is adhered to an outer surface of the inner polyethylene-based resin layer 11 via the dry laminate adhesive layer 23. In the present embodiment, the PET film layer 13 has a thickness of approximately 12 μm.

An anchor coat (AC) layer 13a for enhancing adhesive strength is applied to an outer surface of the PET film layer 13, and a laminated body of the inner polyethylene-based resin layer 11 and the PET film layer 13 as described above is adhered to the polyolefin resin layer 15 via the extruded polyethylene layer 14 as an adhesive layer. In the present embodiment, the extruded polyethylene layer 14 has a thickness of approximately 30 μm.

The polyolefin resin layer 15 in the present embodiment is a film member formed of polyethylene (PE). Examples of polyethylene used for the polyolefin resin layer 15 may include low-density polyethylene (LDPE), linear low-density polyethylene (LLDPE), and high-density polyethylene resin (HDPE). Excellent squeeze properties may be imparted to the trunk 1a of the container main body 1 especially when LLDPE is used. From the perspective of guaranteeing flexibility, restorability, or the like of the trunk 1a of the container main body 1, the polyolefin resin layer 15 preferably has a thickness in the range of 60 μm to 200 μm. In the present embodiment, the thickness of the polyolefin resin layer 15 is approximately 100 μm. By thus forming the thickness of the polyolefin resin layer 15 greater than the thickness of the barrier layer and the high reflection layer 19, restorability of the trunk 1a is guaranteed. Additionally, the composition of the polyolefin resin layer 15 is not limited to the above embodiment, and polypropylene, which is a polyolefin resin other than polyethylene, or the like may also be used. Further, any of a variety of resins other than a polyolefin resin may also be used.

An AC layer 17a is applied to an inner surface of the aluminum foil 17 in a laminate body of the aluminum foil 17, the high reflection layer 19, the outer polyethylene-based resin layer 21, and the high hardness protective layer 18. Then, these are adhered to a laminate body of the inner polyethylene-based resin layer 11, the PET film layer 13, and the polyolefin resin layer 15 via the extruded polyethylene layer 16 as an adhesive layer. In the present embodiment, the extruded polyethylene layer 16 has a thickness of approximately 30 μm.

Figure 5:
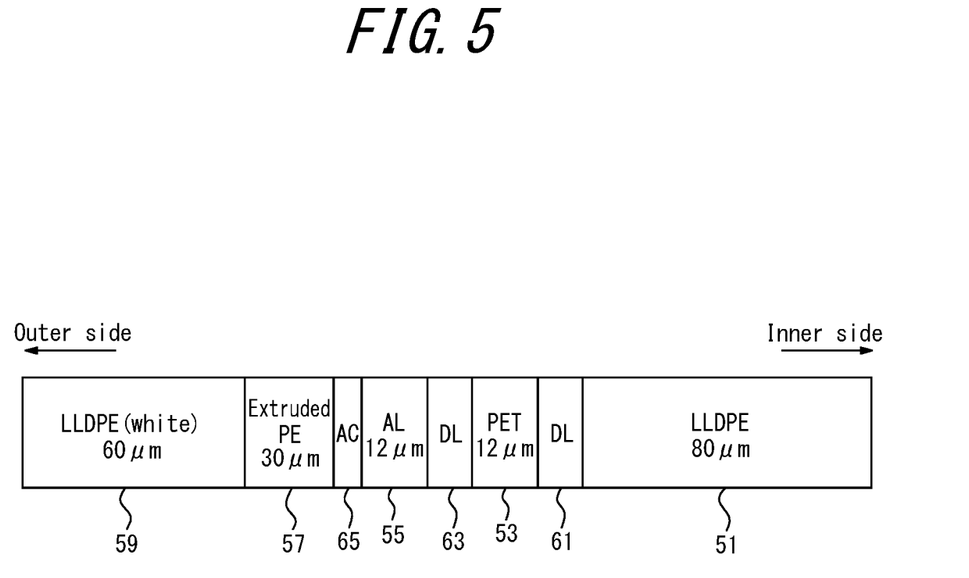
FIG. 5 illustrates a layer composition of a reinforcing tape in the tube container according to the embodiment of the present disclosure.

Next, the reinforcing tape 35 will be described. As illustrated in FIG. 2 and FIG. 3, the reinforcing tape 35 is provided on the inner surface of the tube body 30 in a manner such that the reinforcing tape 35 extends along the butted portion 32 in a band shape in a vertical direction. The reinforcing tape 35 in the present embodiment has a layer composition as illustrated in FIG. 5. That is, the reinforcing tape 35 includes, in order from the inner side which is the side closer to the container space S, an inner reinforcing resin layer 51, a dry laminate (DL) adhesive layer 61, a polyethylene terephthalate (PET) film layer 53, a dry laminate (DL) adhesive layer 63, an aluminum (AL) foil 55, an extruded polyethylene (PE) layer 57, and an outer reinforcing resin layer 59.

The inner reinforcing resin layer 51 in the present embodiment is made of linear low-density polyethylene (LLDPE). Any of a variety of polyethylene-based resins other than LLDPE, such as low-density polyethylene (LDPE) or high-density polyethylene resin (HDPE), can be used for the inner reinforcing resin layer 51. In the present embodiment, the inner reinforcing resin layer 51 has a thickness of approximately 80 μm.

A PET film layer 53 is adhered to an outer surface of the inner reinforcing resin layer 51 via a dry laminate adhesive layer 61. Since the PET film layer 53 is included in the reinforcing tape 35, strength of the reinforcing tape 35 can be increased, and it can be further ensured that joining between the both edges 31a, 31b at the butted portion 32 is reinforced. In the present embodiment, the PET film layer 53 has a thickness of approximately 12 μm.

An aluminum (AL) foil 55 is adhered to an outer surface of the PET film layer 53 via a dry laminate adhesive layer 63. The aluminum foil 55 functions as a barrier layer having light shielding properties, oxygen barrier properties, and water vapor barrier properties. That is, even if joining between the both edges 31a, 31b at the butted portion 32 peels off, the contents contained in the container space S of the container main body 1 are prevented from undergoing deterioration and change in quality due to contact with light, oxygen, water vapor, or the like. The thickness of the aluminum foil 55 is preferably in the range of 7 μm to 20 μm from the perspective of properly maintaining flexibility of the trunk 1a while guaranteeing the necessary light-shielding, oxygen-barrier and water vapor-barrier properties. In the present embodiment, the aluminum foil 55 has a thickness of approximately 12 μm. Additionally, as the barrier layer, a metal foil other than an aluminum foil (e.g., a gold foil, silver foil, platinum foil, copper foil, titanium foil, tin foil, etc.) may be also used.

An anchor coat (AC) layer 65 for increasing adhesive strength is applied to an outer surface of the aluminum foil 55, and these are adhered to an outer reinforcing resin layer 59 via an extruded polyethylene layer 57 as an adhesive layer. In the present embodiment, the extruded polyethylene layer 57 has a thickness of approximately 30 μm.

The outer reinforcing resin layer 59 in the present embodiment is made of linear low-density polyethylene (LLDPE). Any of a variety of polyethylene-based resins other than LLDPE, such as low-density polyethylene (LDPE) or high-density polyethylene resin (HDPE), can be used for the outer reinforcing resin layer 59. In the present embodiment, the outer reinforcing resin layer 59 has a thickness of approximately 60 μm and is colored in white.

As illustrated in FIG. 2, the reinforcing tape 35 in the present embodiment extends along the butted portion 32 from one end of the tube body 30 that is connected to the head 40 of the tube body 30 to another end of the tube body 30 that is closed so as to form the bottom 1b. The reinforcing tape 35 is bonded to the inner surface of the tube body 30 over the entire range of the butted portion 32 in a longitudinal direction across the both edges 31a, 31b. With the above configuration, joining at the butted portion 32 of the laminate sheet 31 is reinforced by the reinforcing tape 35, and further, even if joining between the both edges 31a, 31b at the butted portion 32 peels off, the portion remains held by the reinforcing tape 35, and leakage of the contents from the portion may be prevented.

Figure 6:
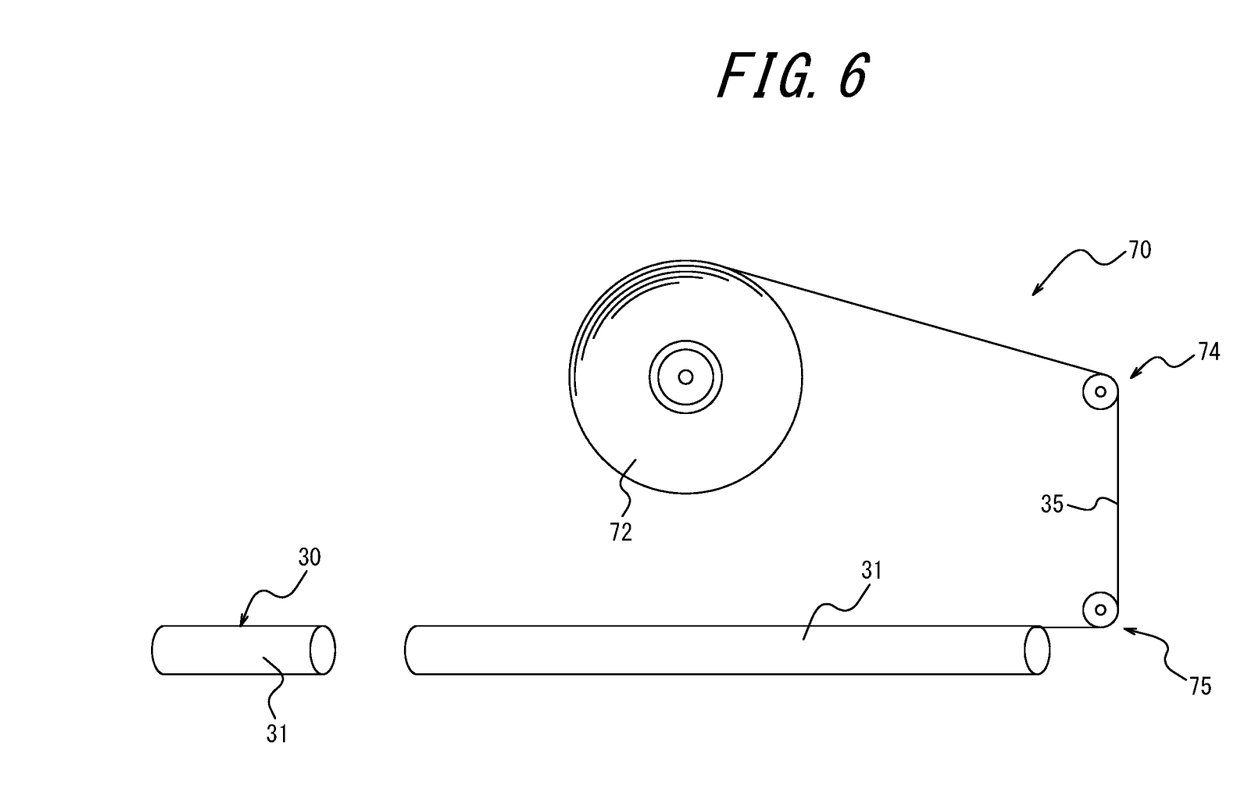
FIG. 6 schematically illustrates a feeding apparatus for feeding the reinforcing tape.

The reinforcing tape 35 described above can be fed to the laminated sheet 31 using a feeding apparatus 70 for the reinforcing tape 35 as illustrated in FIG. 6. The feeding apparatus 70 includes a roll 72 for feeding the reinforcing tape 35 that has the laminated structure illustrated in FIG. 5 in advance, and feeds the reinforcing tape 35 fed from the roll 72 toward an inward side of the laminated sheet 31 through a guide roller 74 and a guide roller 75.

After being fed onto the inner surface of the laminate sheet 31 using the aforementioned feeding apparatus 70, the reinforcing tape 35 is pressed against the inner surface of the laminate sheet 31 while being heated to a predetermined temperature by, for example, a molding apparatus which is not illustrated, so as to be welded to the butted portion 32 of the both edges 31a, 31b. At this time, because, as illustrated in FIG. 5, the reinforcing tape 35 is formed so that the thickness of each of the outer reinforcing resin layer 59 and the inner reinforcing resin layer 51 is greater than the thickness of any other intermediate layer, part of the outer reinforcing resin layer 59 and part of the inner reinforcing resin layer 51 are pressed out laterally (i.e., in a circumferential direction in FIG. 3) beyond other intermediate layers, and the pressed part of the outer reinforcing resin layer 59 and the pressed part of the inner reinforcing resin layer 51 weld to each other so as to cover end portions of the other intermediate layers in the circumferential direction and to be welded to the inner surface of the laminate sheet 31. Thus, because the end portions of the aluminum foil 55 and the like illustrated in FIG. 5 in the circumferential direction are covered by the outer reinforcing resin layer 59 and the inner reinforcing resin layer 51, the aluminum foil 55 and the like are isolated from the container space S. This can prevent direct contact of the contents in the container space S with the aluminum foil 55 and the like, thereby preventing degradation in quality due to discoloration or the like of the contents. The laminated sheet 31 to which the reinforcement tape 35 has been welded is cut in the longitudinal direction so as to form the tube body 30.

Further, in the present embodiment, the outer reinforcing resin layer 59 is colored in white so as to have a color different from color(s) of other layers (e.g., the inner reinforcing resin layer 51 and the aluminum foil 55). Due to the above configuration, the outer reinforcing resin layer 59 facing an inner circumferential surface of the laminate sheet 31 among the constituent layers of the reinforcing tape 35 may have a color different from color(s) of the other layers, including the inner reinforcing resin layer 51 and the aluminum foil 55. It can therefore be easily confirmed whether lateral sides of the aluminum foil 55 and the like are sufficiently covered by the outer reinforcing resin layer 59 or the like by visually checking the laminated sheet 31 with the reinforcement tape 35 from the inner side and confirming how much of the outer reinforcing resin layer 59 protrudes laterally (i.e., in the circumferential direction).

Next, the dispensing cap 2 will be described. The dispensing cap 2 is provided with the dispensing orifice through which the contents in the container space S of the container main body 1 are dispensed to the outside, and is fitted to the annular projection 42b provided in the mouth 42 of the container main body 1 by undercut engagement. Further, the lid 3 is provided above the dispensing cap 2 so as to cover the dispensing orifice. The lid 3 is integrally formed with the dispensing cap 2 via a hinge which is not illustrated, and the dispensing orifice can be opened or can be closed by the lid 3 by rotating the lid 3 about the hinge. Additionally, fitting of the dispensing cap 2 to the container main body 1 is not limited to the aforementioned undercut engagement, and the dispensing cap 2 may also be configured to be fitted to a male screw portion formed in the mouth 42 of the container main body 1 by screwing engagement.

To dispense the contents from the tube container 100 configured as described above, the lid 3 is rotated about the hinge so as to bring the dispensing orifice into an open state, and subsequently, the tube container 100 is repositioned so that the dispensing orifice faces an application area, and the trunk 1*a* is put under pressure (i.e., squeezed). By doing so, pressure in the container space S of the container main body 1 increases, and the contents are dispensed to the outside through the dispensing orifice.

After dispensing a required amount of the contents, pressure on the trunk 1*a* is released. By doing so, pressure in the container space S is returned to outer air pressure, and the trunk 1*a* of the container main body 1 returns to its original shape by its own restoring force. The laminate sheet 31 for the tube body 30 that constitutes the trunk 1*a* of the container main body 1 includes the aluminum foil 17 as the barrier layer and the polyolefin resin layer 15 whose thickness is greater than the thickness of the high reflection layer 19 provided to improve glossy and shiny properties. Accordingly, in conjunction with releasing of the pressure on the trunk 1*a*, the trunk 1*a* returns to the original shape, a shape before the pressure is put, due to excellent restorability against deformation that is attributed to its material properties.

As described above, the tube container 100 according to the present embodiment is configured as follows. That is, the tube container 100 includes the tube body 30 that defines the container space S for contents and that has the laminated structure of a plurality of materials, wherein the tube body 30 includes: the cylindrical laminated sheet 31 in which the both edges 31*a*, 31*b* of the sheet are butted together; and the reinforcing tape portion (reinforcing tape 35) provided on the inner surface of the laminated sheet 31 along the butted portion 32, and the laminate sheet 31 includes the high hardness protective layer 18 constituting the outermost layer, the outer polyethylene-based resin layer 21 formed on the inner side of the high hardness protective layer 18, and the inner polyethylene-based resin layer 11 constituting the innermost layer, the high hardness protective layer 18 having a pencil hardness of 3B or greater than 3B, and wherein the reinforcing tape portion (reinforcing tape 35) includes the polyethylene-based resin layer (outer reinforcing resin layer 59) as the outermost layer abutting against the inner surface of the laminate sheet 31. By adopting the above configuration, the high hardness protective layer 18 having a predetermined hardness is formed as the outermost layer of the container main body 1 of the tube container 100, and therefore, generation of scratches on the surface of the tube container 100 can be prevented.

It should be noted that, since in the present embodiment the innermost layer of the laminate sheet 31 and the innermost layer of the reinforcing tape 35 are both polyethylene-based resin layers, when the open end at the lower portion of the tube body 30 is closed by means, such as high-frequency seals or heat seals, so as to form the bottom 1*b*, the open end including a portion corresponding to the reinforcing tape 35 is easily sealed. Similarly, when the upper end of the tube body 30 is welded with the head 40, the outer circumferential edge of the shoulder 41 can be easily welded to the inner circumferential surface at the upper end of the tube body 30 over the entire circumference thereof.

Further, in the present embodiment, the high hardness protective layer 18 is configured to contain polyethylene terephthalate. By adopting the above configuration, polyethylene terephthalate having a predetermined hardness is used as the high hardness protective layer 18 constituting the outermost layer of the tube container 100, and generation of scratches on the surface of the tube container 100 can be effectively prevented.

Further, in the present embodiment, the outer polyethylene-based resin layer 21 is configured to have a thickness greater than a thickness of the high hardness protective layer 18. By adopting the above configuration, when the both edges 31*a*, 31*b* of the laminate sheet 31 are butted together for high-frequency sealing or heat-sealing, the both edges of the outer polyethylene-based resin layer 21 having a relatively low melting point can be welded together with a predetermined degree of strength. Accordingly, even if the both edges of the high hardness protective layer 18 cannot be sealed together with a sufficient degree of strength due to, for example, a high melting point of the high hardness protective layer 18, it is possible to guarantee welding strength at the outer polyethylene-based resin layer 21, whereby defects, such as flexure of the butted portion 32 caused when welding between the both edges 31*a*, 31*b* peels off at the butted portion 32, may be prevented.

Further, in the present embodiment, the outer polyethylene-based resin layer 21 is configured to have a thickness of 30 µm or more, and the high hardness protective layer 18 is configured to have a thickness of 16 µm or less. By adopting the above configuration, even if the both edges of the high hardness protective layer 18 cannot be sealed together with a sufficient degree of strength, it is possible to guarantee welding strength at the portion corresponding to the outer polyethylene-based resin layer 21, whereby defects, such as flexure of the butted portion 32 caused when welding between the both edges 31*a*, 31*b* peels off at the butted portion 32, may be prevented.

Further, in the present embodiment, the outermost layer and the innermost layer of the reinforcing tape portion (reinforcing tape 35) are each configured to have a thickness greater than a thickness of any other intermediate layer. By adopting the above configuration, the end portions of the intermediate layers, such as the aluminum foil 55, in the circumferential direction are covered by the outer reinforcing resin layer 59 and the inner reinforcing resin layer 51, and this can prevent direct contact of the contents in the container space S with the aluminum foil 55 and the like, thereby preventing degradation in quality due to discoloration or the like of the contents.

Further, in the present embodiment, the outermost layer of the reinforcing tape portion (reinforcing tape 35) is configured to have a color different from color(s) of other constituent layers of the reinforcing tape portion. By adopting the above configuration, when the reinforcing tape 35 is high-frequency sealed or heat-sealed to the inner surface of the laminate sheet 31, it can therefore be easily confirmed whether the lateral sides of the aluminum foil 55 and the like are sufficiently covered by the outer reinforcing resin layer 59 by confirming how much of the outer reinforcing resin layer 59 protrudes laterally (i.e., in the circumferential direction).

Further, in the present embodiment, the laminated sheet 31 and the reinforcing tape portion (reinforcing tape 35) are each configured to include a barrier layer having a metal foil.

By adopting the above configuration, even if joining between the both edges 31a, 31b at the butted portion 32 peels off, the metal foil (aluminum foil 55) included in the reinforcing tape 35 can prevent permeation of light, oxygen, water vapor, or the like, and the contents contained in the container space S of the container main body 1 are prevented from undergoing deterioration and change in quality due to contact with light, oxygen, water vapor, or the like.

While the present disclosure has been described based on the drawings and examples, it should be noted that various changes and modifications may be implemented by those skilled in the art based on the present disclosure. Accordingly, such changes and modifications are to be understood as included within the scope of this disclosure. For example, functions or the like included in each component can be rearranged without logical inconsistency, and a plurality of components can be combined together or divided. These are to be understood as included in the scope of the disclosure herein.

For example, although in the present embodiment a polyethylene terephthalate (PET) film is used as the high hardness protective layer 18, the present disclosure is not limited to this embodiment. Any film having a predetermined hardness other than a PET film may be used as the high hardness protective layer 18.

Further, although in the present embodiment the thickness of the outer polyethylene-based resin layer 21 is configured to be greater than the thickness of the high hardness protective layer 18, the present disclosure is not limited to this embodiment. The reinforcing tape 35 only needs to provide enough reinforcement to prevent leakage of the contents from the butted portion 32 of the laminate sheet 31.

Further, although in the present embodiment the outermost layer and the innermost layer of the reinforcing tape 35 are each configured to have a thickness greater than a thickness of any other intermediate layer, the present disclosure is not limited to this embodiment. Other means may also be used to configure each intermediate layer not to contact the contents, or alternatively, it is not necessarily needed to configure each intermediate layer not to contact the contents depending on the contents.

Further, although in the present embodiment the outer reinforcing resin layer 59 of the reinforcing tape 35 is configured to be colored in white, the present disclosure is not limited to this embodiment. The outer reinforcing resin layer 59 may be colored in a color other than white that is different from other layers of the reinforcing tape 35. Moreover, the outer reinforcing resin layer 59 does not necessarily need to be colored.

Further, although in the present embodiment the laminate sheet 31 and the reinforcing tape 35 are each configured to include the barrier layer having the aluminum foil 17, 55, the present disclosure is not limited to this embodiment. Only the laminate sheet 31 may be configured to include the barrier layer, or alternatively, it is not necessarily needed for either of the laminate sheet 31 and the reinforcing tape 35 to include the barrier layer depending on the contents.

Further, although in the present embodiment the high reflection layer 19 is configured in a manner such that the decoration is provided by gravure printing on the outer surface of the base material and that the aluminum vapor-deposited film is formed on the inner surface of the base material, the present disclosure is not limited to this embodiment. The decoration by printing does not necessarily need to be provided on the outer surface of the base material, in which case the aluminum vapor-deposited film may be formed on the outer surface of the base material. Further, the aluminum vapor-deposited film may be formed on both sides of the base material. Further, the laminated sheet 31 does not necessarily need to include the high reflection layer 19.

Further, gravure printing may be performed on the inner surface of the high hardness protective layer 18.

Examples (Hardness and Wear Resistance)

Next, for layer compositions of the laminated sheet 31 for the tube body 30 constituting the trunk 1a of the tube container 100 illustrated in FIG. 1, the layer composition illustrated in FIG. 4 (Example 1), and a layer composition (Comparative Example 1) obtained by excluding the outer high hardness protective layer 18 and the dry laminate (DL) adhesive layer 29 from FIG. 4 were prepared, and a pencil hardness measurement and a wear resistance test were conducted for each layer composition.

Table 1 summarizes, for each of Example 1 and Comparative Example 1, respective results of the pencil hardness measurement and the wear resistance test. Pencil hardness was measured by the scratch hardness (pencil method) measurement defined by JIS K 5600-5-4. In wear resistance tests, reciprocating motion was made 100 times while a load of 1.8 kgf was applied between a filter paper and the outermost layer of each laminated sheet, and it was evaluated whether scratches beyond the standard occurred in the outermost layer of the laminated sheet.

TABLE 1

| | Example 1 | Comparative Example 1 |
|---|---|---|
| Pencil hardness | H | Less than 6B |
| Wear resistance test | Good | Bad |

In the wear resistance tests in Table 1, "good" indicates that scratches beyond the standard are not generated, and "bad" indicates that scratches beyond the standard are generated.

Regarding pencil hardness, a pencil hardness of "H" was obtained for Example 1, whereas the result was "less than 6B" for Comparative Example 1. Further, in the wear resistance tests, scratches beyond the standard were not generated in Example 1, whereas generation of scratches beyond the standard was observed in Comparative Example 1. It should be noted that the applicant has conducted a wear resistance test with respect to every pencil hardness and confirmed that, when the pencil hardness is "3B" or greater, scratches beyond the standard are not generated.

(Thickness of High Hardness Protective Layer and Joining Strength at Butted Portion)

Subsequently, evaluation was performed on relationship between the thickness of the high hardness protective layer 18, the thickness of the outer polyethylene-based resin layer 21, and joining strength at the butted portion 32. Results are shown in Table 2.

TABLE 2

| | Example 1 | Example 2 | Example 3 |
|---|---|---|---|
| Thickness of high hardness protective layer | 12 | 16 | 20 |
| Thickness of outer polyethylene-based resin layer | 60 | 60 | 60 |

TABLE 2-continued

|  | Example 1 | Example 2 | Example 3 |
|---|---|---|---|
| Joining strength at butted portion | Good | Good | Bad |

According to Table 2, when the thickness of the high hardness protective layer 18 is 12 μm (as in Example 1) or 16 μm (as in Example 2), good joining strength is achieved at the butted portion 32, and defects, such as peel-off at the butted portion 32, was not found. On the other hand, when the thickness of the high hardness protective layer 18 is 20 μm (as in Example 3), it was recognized that the butted portion 32 peeled off. The reason appears that, because in Example 1 and Example 2 the thickness (60 μm) of the outer polyethylene-based resin layer 21 is sufficiently greater than the thickness (12 μm or 16 μm) of the high hardness protective layer 18, joining strength at the entire butted portion 32 is maintained in a good condition due to joining at the portion corresponding to the outer polyethylene-based resin layer 21 even when joining strength at the high hardness protective layer 18 is not sufficient. On the other hand, in Example 3, because a difference between the thickness (60 μm) of the outer polyethylene-based resin layer 21 and the thickness (20 μm) of the high hardness protective layer 18 is small, when joining strength at the high hardness protective layer 18 is not sufficient, it is considered that joining strength at the entire butted portion 32 cannot be maintained in a good condition by joining at the portion corresponding to the outer polyethylene-based resin layer 21. Additionally, it has been also turned out that the thickness of the outer polyethylene-based resin layer 21 is preferably 30 μm or more.

INDUSTRIAL APPLICABILITY

The present disclosure enables proposal of the tube container 100 in which generation of scratches on the surface of the container can be prevented.

REFERENCE SIGNS LIST

1 Container main body
1*a* Trunk
1*b* Bottom
2 Dispensing cap
3 Lid
11 Inner polyethylene-based resin layer
13 Polyethylene terephthalate (PET) film layer
13*a* Anchor coat (AC) layer
14 Extruded polyethylene (PE) layer
15 Polyolefin resin layer
16 Extruded polyethylene (PE) layer
17 Aluminum foil (metal foil)
17*a* Anchor coat (AC) layer
18 High hardness protective layer
19 High reflection layer
21 Outer polyethylene-based resin layer
23 Dry laminate adhesive layer
25 Dry laminate adhesive layer
27 Dry laminate adhesive layer
29 Dry laminate adhesive layer
30 Tube body
31 Laminated sheet
31*a*, 31*b* Edge
32 Butted portion
35 Reinforcing tape (reinforcing tape portion)
40 Head
41 Shoulder
42 Mouth
42*a* Opening
42*b* Annular projection
51 Inner reinforcing resin layer
53 Polyethylene terephthalate (PET) film layer
55 Aluminum (AL) foil
57 Extruded polyethylene (PE) layer
59 Outer reinforcing resin layer (polyethylene-based resin layer)
61 Dry laminate adhesive layer
63 Dry laminate adhesive layer
65 Anchor coat (AC) layer
70 Feeding apparatus
72 Roll
74 Guide roller
75 Guide roller
100 Tube container
S Container space

The invention claimed is:

1. A tube container including a tube body that defines a container space for contents and that has a laminated structure of a plurality of materials, wherein
the tube body comprises:
a cylindrical laminated sheet in which both edges of the sheet are butted together; and
a reinforcing tape portion provided on an inner surface of the laminated sheet along a butted portion, and
the laminate sheet includes a high hardness protective layer constituting an outermost layer, an outer polyethylene-based resin layer formed on an inner side of the high hardness protective layer, and an inner polyethylene-based resin layer constituting an innermost layer, the high hardness protective layer having a pencil hardness of 3B or greater than 3B and containing polyethylene terephthalate, and wherein
the reinforcing tape portion includes a polyethylene-based resin layer as an outermost layer abutting against the inner surface of the laminate sheet.

2. The tube container according to claim 1, wherein the laminated sheet and the reinforcing tape portion each includes a barrier layer having a metal foil.

3. The tube container according to claim 1, wherein the outer polyethylene-based resin layer has a thickness greater than a thickness of the high hardness protective layer.

4. The tube container according to claim 3, wherein the outer polyethylene-based resin layer has a thickness of 30 μm or more, and the high hardness protective layer has a thickness of 16 μm or less.

5. The tube container according to claim 1, wherein the outermost layer and an innermost layer of the reinforcing tape portion each have a thickness greater than a thickness of any other intermediate layer of the reinforcing tape portion.

6. The tube container according to claim 5, wherein the outermost layer of the reinforcing tape portion has a color different from a color of other constituent layers of the reinforcing tape portion.

* * * * *